W. H. KELLER.
DUST COLLECTOR FOR VACUUM CLEANERS.
APPLICATION FILED JAN. 16, 1909.
1,127,896.
Patented Feb. 9, 1915.
2 SHEETS—SHEET 1.
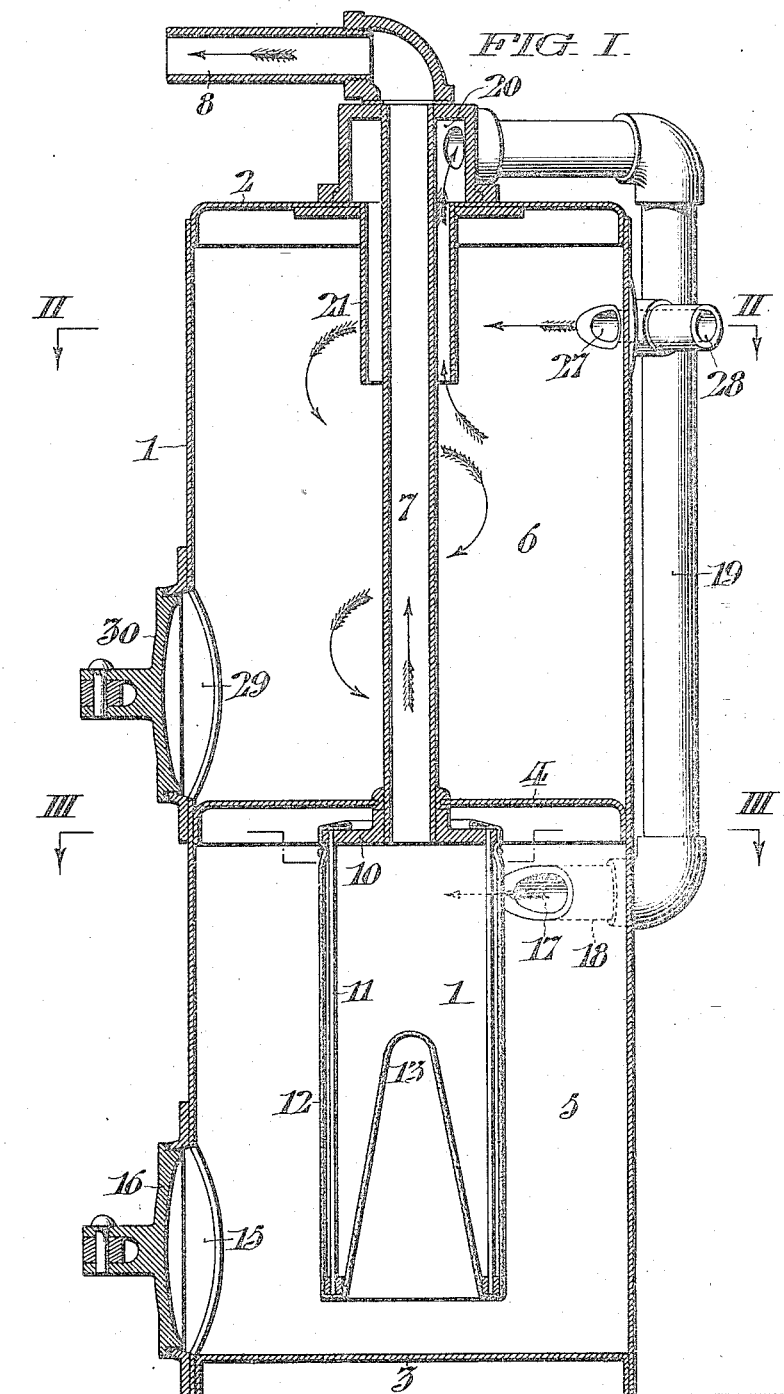
WITNESSES:
John C. Bergner
James H. Bell
INVENTOR:
William H. Keller,
by his Attorneys
Kerr & King W. H. KELLER.
DUST COLLECTOR FOR VACUUM CLEANERS.
APPLICATION FILED JAN. 16, 1909.
1,127,896.
Patented Feb. 9, 1915.
2 SHEETS—SHEET 2.
FIG. II.
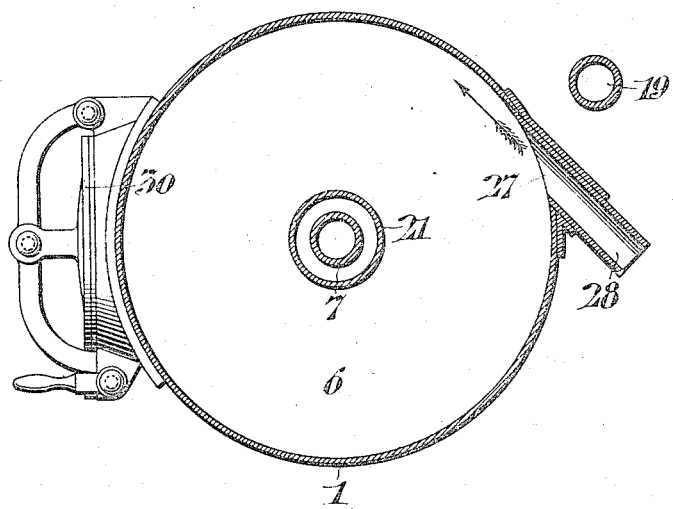
FIG. III.
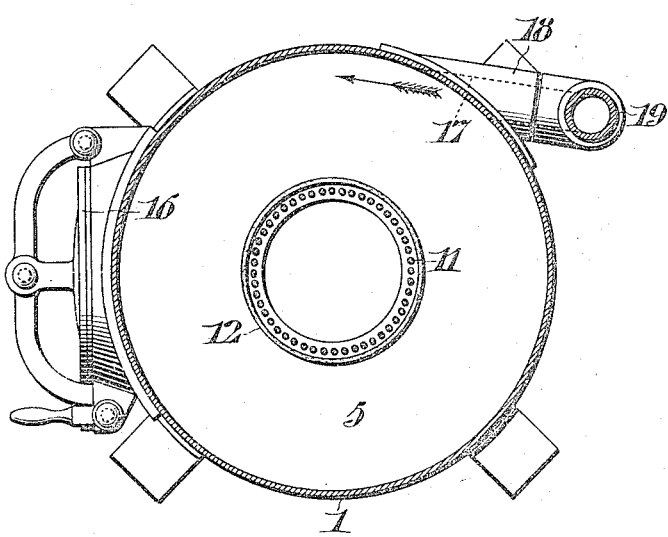
WITNESSES:
INVENTOR:
William H. Keller,
by his Attorneys

UNITED STATES PATENT OFFICE.

WILLIAM H. KELLER, OF PHILADELPHIA, PENNSYLVANIA, ASSIGNOR, BY MESNE ASSIGNMENTS, TO SANTO MANUFACTURING COMPANY, OF PHILADELPHIA, PENNSYLVANIA, A CORPORATION OF DELAWARE.

DUST-COLLECTOR FOR VACUUM-CLEANERS.

1,127,896.      Specification of Letters Patent.      Patented Feb. 9, 1915.

Application filed January 16, 1909. Serial No. 472,573.

*To all whom it may concern:*

Be it known that I, WILLIAM H. KELLER, of Philadelphia, in the county of Philadelphia and State of Pennsylvania, have invented certain new and useful Improvements in Dust-Collectors for Vacuum-Cleaners, whereof the following is a specification, reference being had to the accompanying drawings.

My invention relates to a dust collector whereby separation of dust from air may be efficiently secured without the employment of water. It is intended to be used in conjunction with vacuum cleaner apparatus of any well known type. I have accordingly shown in the drawings neither the cleaning apparatus proper by which the suction is applied to the object to be cleaned, nor the suction producing apparatus, but only the separating device which is so interposed that the current of dust laden air is compelled to pass through it, and whereby the dust is removed from the air and collected.

In my dust collector, I employ a dust collecting chamber, preferably of cylindrical form, with an aperture whereby the dust laden air is compelled to enter the cylindrical chamber in tangential relation thereto, so as to be whirled around therein for a considerable period before being drawn out, during which process gravity deprives it of more or less of the dust, which is deposited at the bottom of the receptacle. This gravity separation is preferably combined with means for accomplishing further separation by a screen or sieve, such as a suitable textile filter, and I have illustrated my invention as applied in this combination.

In the accompanying drawings, Figure I, is a vertical sectional view of an apparatus embodying my invention. Fig. II, is a horizontal section along the line II, II, of Fig. I. Fig. III, is a similar view along the line III, III, in Fig. I.

In the drawings, my apparatus is built in the form of an upright cylinder 1, provided with a top 2, and a bottom 3, and sub-divided horizontally by a diaphragm 4, into a lower cylindrical chamber 5, and an upper cylindrical chamber 6. This latter chamber is traversed axially from end to end by a pipe 7, which communicates at its upper end with a pipe 8, leading to a source of suction. The pipe 7, at its lower end after passing through the diaphragm 4, passes through a disk 10, which supports a cylindrical wire frame 11, around which is applied a covering 12, of suitable filtering material, such as a finely woven textile, like cloth or linen, the lower end of this covering being free to be drawn by suction within the frame 11, as shown at 13, whereby the filtering area is somewhat increased. The lower chamber 5, within which this filter is mounted, is provided with a cleaning aperture 15, fitted with a suitable door 16. Near the upper end of the chamber 5, is an aperture 17, fitted with a pipe 18, which approaches the wall of the cylinder in tangential relation thereto, as shown in the drawings. By suitable elbows and pipes 19, this pipe 18, is put in communication with a cylindrical cap 20, which communicates with the interior of the upper chamber 6, by means of a sleeve 21, surrounding the pipe 7. This upper chamber 6, also has near its upper end, an aperture 27, fitted with a pipe 28, which approaches and enters the cylinder in tangential relation thereto, and which is in turn connected with the pipe leading to the cleaning apparatus. The upper chamber is also provided with a dust removing aperture 29, protected by a door 30.

The operation of my device is as follows:—The pipe 8, having been connected with the source of suction, and the pipe 28, with the cleaning apparatus, the dust laden air entering the upper chamber 6, by the pipe 28, and aperture 27, is compelled by reason of the tangential relation of this pipe to the cylindrical chamber to whirl around the upper part thereof for a considerable time before it is drawn thereout by way of the sleeve 21, during which time more or less of the dust which it carries settles by gravity down upon the bottom of this chamber, and whence from time to time it may be removed by opening the door 30. The air thus relieved of its heavier material, is drawn through the sleeve 21, the casing 20, the pipes 18, and 19, into the lower chamber 5, where it is again caused to whirl around for a certain length of time by reason of the tangential relation of the pipe 18, to the cylindrical chamber 5. During this whirling process the air loses more or less dust and is then drawn through the filtering material 12, into the interior of the hollow cylinder 11, and thence by way of the pipe 7, to the source of suction. The filtering material deprives it of the balance of the dust which it carries which is gradually deposited at the bottom of the chamber 3, whence it may be removed by way of the door 16.

I find that the efficacy of the device is increased according as the sleeve 21, is prolonged downwardly below the level of the tangential opening 27. It may with advantage be made longer than is shown in the drawings, especially as the height of the chamber is increased.

It is obvious that my device is capable of various modifications. The gravity chamber may be used by itself. If two chambers are used they need not be superimposed as shown, and the number of chambers may be increased. The method and order in which they communicate with each other may be varied, the essential point of my invention being that in addition to or apart from the ordinary cloth filtration, I provide a separating chamber to which the air is led in such tangential relation as to be whirled around therein for a time before being drawn therefrom in order to permit gravity to remove more or less of the dust which it contains.

I prefer to arrange the connection of the chambers so that gravity filtration has first had full opportunity to cleanse the air before passing it through the filtering screen, as I find I am able in this way to rid the air of some 90% of its dust before it passes to the screen or filter. In this way clogging of the filter is prevented, and a less amount of suction enabled to do a greater amount of cleansing.

Having thus described my invention, I claim:—

1. In a dust separator, an upright receptacle, an intake for said receptacle connected thereto near its upper end and in tangential relation to its axis, an axial suction pipe connected to said receptacle at its upper end and extending into said receptacle to a point below the level of the intake, a second receptacle having an intake connected near its upper end in tangential relation to its axis, an axial suction pipe entering said second receptacle at its upper end, means for connecting the intake of said second receptacle with the suction pipe of the first receptacle, a disk connected to the suction pipe of the second receptacle, a rigid skeleton frame carried by said disk, and a filtering material surrounding and supported by said frame.

2. In a dust separator, a cylindrical receptacle, a partition intermediate the ends of said receptacle and dividing the same into chambers, an intake connected to one of said chambers adjacent its upper end and arranged tangentially to the axis of said chamber, a suction pipe connected to said chamber centrally thereof, an intake connected to the other chamber near its upper end, a pipe connecting said last named intake with the suction pipe of the first named chamber, a suction pipe connected to said last named chamber, and a filtering screen surrounding the opening of said last named suction pipe.

3. In a dust separator, a cylindrical receptacle, a partition intermediate the ends of said receptacle and dividing the same into chambers, an intake connected to one of said chambers adjacent its upper end and arranged tangentially to the axis of said chamber, a suction pipe connected to said chamber centrally thereof, an intake connected to the other chamber near its upper end, a pipe connecting said last named intake with the suction pipe of the first named chamber, a suction pipe connected to said last named chamber, a disk carried by said last named suction pipe, a wire frame supported by said disk, and a filtering material carried by said disk and surrounding said frame.

4. In a dust separator, a cylindrical casing, a horizontal partition located intermediate the ends of said casing, an intake pipe connected to said casing adjacent its upper end, a suction pipe connected to the upper end of said casing and extending into the same to a point below the intake pipe, an intake connected to said receptacle at a point below and adjacent said partition, a pipe connecting said last named intake with the suction pipe at the upper end of the receptacle, a suction pipe extending through said first named suction pipe and through said partition, and a filtering screen surrounding the opening in said suction pipe extending through the partition.

5. In a dust separator, a cylindrical casing, a horizontal partition located intermediate the ends of said casing, an intake pipe connected to said casing adjacent its upper end, a suction pipe connected to the upper end of said casing and extending into the same to a point below the intake pipe, an intake connected to said receptacle at a point below and adjacent said partition, a pipe connecting said last named intake with the suction pipe at the upper end of the receptacle, a suction pipe extending through said first named suction pipe and through said partition, a disk carried by the lower end of said suction pipe extending through the partition, a wire frame carried by said disk, and a filtering material surrounding said wire frame.

In testimony whereof, I have hereunto signed my name, at Philadelphia, Pennsylvania, this thirteenth day of January, 1909.

WILLIAM H. KELLER.

Witnesses:
JAMES H. BELL,
E. L. FULLERTON.